US010295392B1

(12) United States Patent
Jones

(10) Patent No.: US 10,295,392 B1
(45) Date of Patent: May 21, 2019

(54) REMOVABLE PORTABLE WIRELESS FLUID SENSOR SYSTEM

(71) Applicant: James Michael Jones, Corpus Christi, TX (US)

(72) Inventor: James Michael Jones, Corpus Christi, TX (US)

( * ) Notice: Subject to any disclaimer, the term of this patent is extended or adjusted under 35 U.S.C. 154(b) by 150 days.

(21) Appl. No.: 15/212,156

(22) Filed: Jul. 15, 2016

Related U.S. Application Data

(60) Provisional application No. 62/192,965, filed on Jul. 15, 2015.

(51) Int. Cl.
*G01F 23/284* (2006.01)
*E21B 43/26* (2006.01)

(52) U.S. Cl.
CPC ............ *G01F 23/284* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 2007/0194981 A1* | 8/2007 | Hagg | ...................... | G01F 23/18 342/124 |
| 2013/0009803 A1* | 1/2013 | Edvardsson | .......... | G01F 23/284 342/124 |
| 2014/0159743 A1* | 6/2014 | Dayal | ................... | G01F 23/284 324/649 |
| 2014/0266864 A1* | 9/2014 | Fredriksson | .......... | G01F 23/284 342/124 |
| 2016/0103006 A1* | 4/2016 | Edvardsson | ........ | G01S 13/0209 342/124 |
| 2016/0103007 A1* | 4/2016 | Fredriksson | .......... | G01F 23/284 342/124 |
| 2016/0320224 A1* | 11/2016 | Eriksson | ............... | G01F 23/284 |
| 2016/0334262 A1* | 11/2016 | Haran | ................... | G01F 23/284 |

* cited by examiner

*Primary Examiner* — Clayton E. LaBalle
*Assistant Examiner* — Dennis Hancock
(74) *Attorney, Agent, or Firm* — Buskop Law Group, P.C.; Wendy Buskop

(57) ABSTRACT

A removable portable wireless fluid sensor system for use in hydrocarbon wells having a sensor assembly with a guided wave radar level and interface transmitter, a single flex probe with a sensor wire, a top tank mounting system for supporting the single flex probe, at least one turbulence breaker, and a secondary wireless controller in communication with a primary wireless controller. The secondary wireless controller communicates with the single flex probe, the guided wave radar level and interface transmitter, and the primary wireless controller. The removable portable wireless fluid sensor system is configured for detecting fluid levels in tanks accurately as levels change due to coiled tubing operations in completions of hydrocarbon wells, snubbing operations in completions of hydrocarbons wells, water transfer operations during fracturing of a hydrocarbon well, and flow back fluid measurement and well testing procedures for hydrocarbon wells.

12 Claims, 7 Drawing Sheets

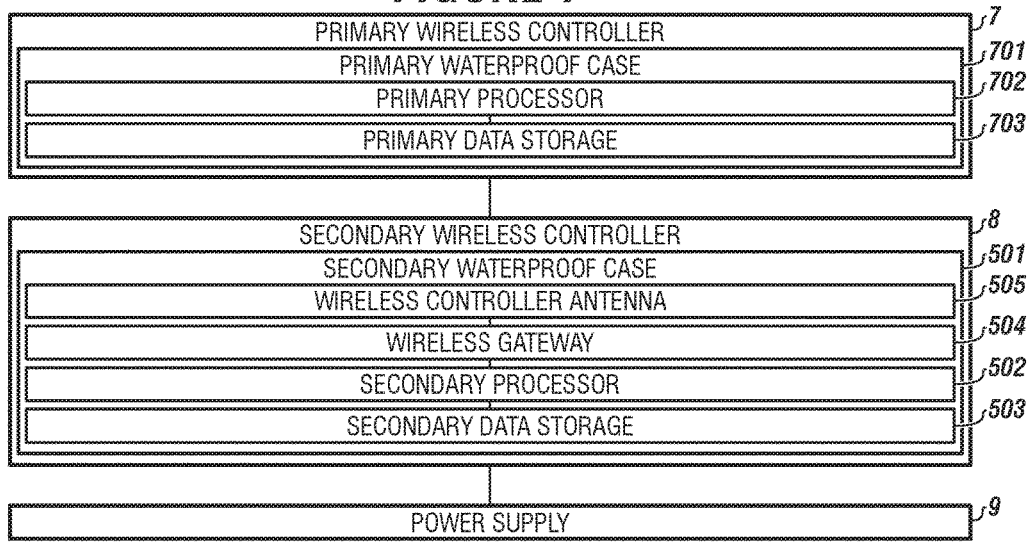

REMOVABLE PORTABLE WIRELESS FLUID SENSOR SYSTEM

CROSS REFERENCE TO RELATED APPLICATION

The current application claims priority to and the benefit of U.S. Provisional Patent Application Ser. No. 62/192,965 filed on Jul. 15, 2015, entitled "REMOVABLE PORTABLE WIRELESS FLUID SENSOR SYSTEM". This reference is hereby incorporated in its entirety.

FIELD

The present embodiments generally relate to a removable portable wireless fluid sensor system for use with hydrocarbon wells.

BACKGROUND

A need exists for a dual controller system using radar reflection to measure volumes in a tank which is easy to use and capable of being remotely monitored, from a remote location.

The present embodiments meet these needs.

BRIEF DESCRIPTION OF THE DRAWINGS

The detailed description will be better understood in conjunction with the accompanying drawings as follows:

FIG. 7 is a diagram of the primary and secondary wireless controllers usable in the removable portable wireless fluid sensor system according to one or more embodiments.

Figure 1:
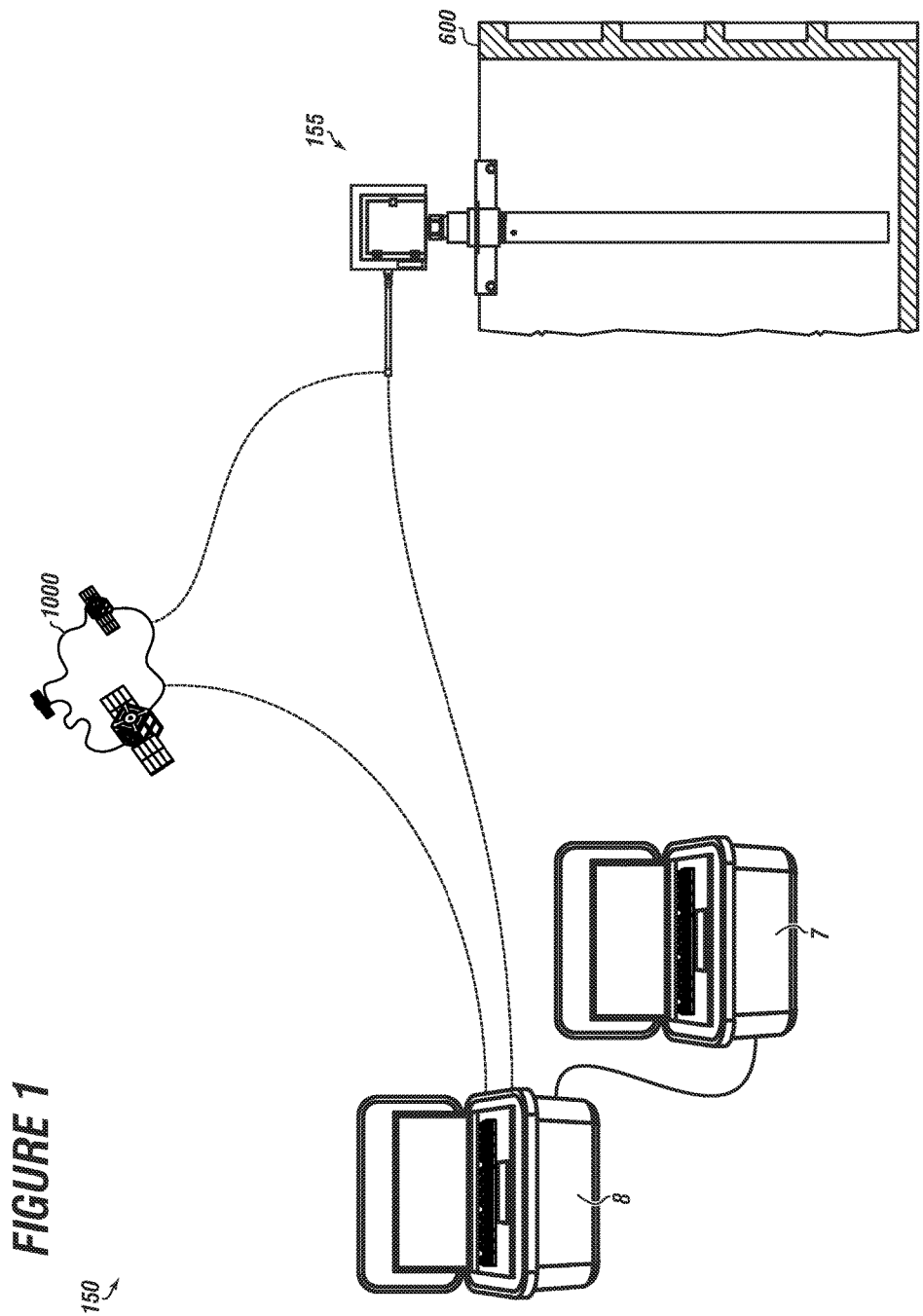
FIG. 1 depicts an overview of removable portable wireless fluid sensor system according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a removable portable wireless fluid sensor system for use with hydrocarbon wells.

In the oilfield where human error at the lowest level can mean the difference between making a good or bad well, or worse a catastrophic incident every effort should be made simplify the operation. The present invention reduces human error in calculating fluid flowing back from (i) coiled tubing operations in completions of hydrocarbon wells, (ii) snubbing operations in completions of hydrocarbons wells, (iii) water transfer operations during fracturing of a hydrocarbon well, and (iv) flow back fluid measurement and well testing procedures for hydrocarbon wells.

The current embodiments provide a dual controller system using radar for highly accurate wireless tank level detection for use on frac tanks that are sealed or unsealed or other open top tanks.

The assembly provides step by step displays in a command, remote trailer, which can receive the signals from a guided wave radar level and interface transmitter.

The system can provide multiple displays from up to 20 different tanks on the same display simultaneously.

The system can provide a zero emission well test.

The system saves lives by preventing human contact with the tank for manual measurement. The system prevents human exposure to hydrogen sulfide and its associated dangerous and toxic properties.

The system prevents human contact that transfers human buildup of static electricity to the tank which can cause explosions and fires.

The system allows for low and high alarm settings for humans to be alerted when tank levels are too high and hydrocarbons can spill on the ground.

The embodiments relate to a removable portable wireless fluid sensor system for use with hydrocarbon wells.

In embodiments, a sensor assembly having a guided wave radar level and interface transmitter, a single flex probe with sensor wire, a top tank mounting system for supporting the single flex probe, a turbulence breaker, and a secondary wireless controller in communication with a primary wireless controller can be used.

The secondary wireless controller can communicate with the single flex probe, the guided wave radar level and interface transmitter, the primary wireless controller, and combinations thereof.

A power supply can be connected to the secondary wireless controller.

The removable portable wireless fluid sensor system can be configured for detecting fluid levels in tanks accurately as levels change due to coiled tubing operations in completions of hydrocarbon wells, snubbing operations in completions of hydrocarbons wells, water transfer operations during fracturing of a hydrocarbon well, and flow back fluid measurement and well testing procedures for hydrocarbon wells.

Turning to the Figures, FIG. 1 depicts an overview of removable portable wireless fluid sensor system according to one or more embodiments.

The removable portable wireless fluid sensor system 150 for use with hydrocarbon wells can have a sensor assembly 155, which can be configured to mount in a tank 600. In embodiments, the tank can be an open top tank.

The removable portable wireless fluid sensor system 150 can have a primary wireless controller 7 and a secondary wireless controller 8. The secondary wireless controller can be in connected to or in communication with a network 1000.

The network can be the internet, another global communications network, a cellular network, a satellite network, a fiber optic network or combinations thereof.

Figure 2:
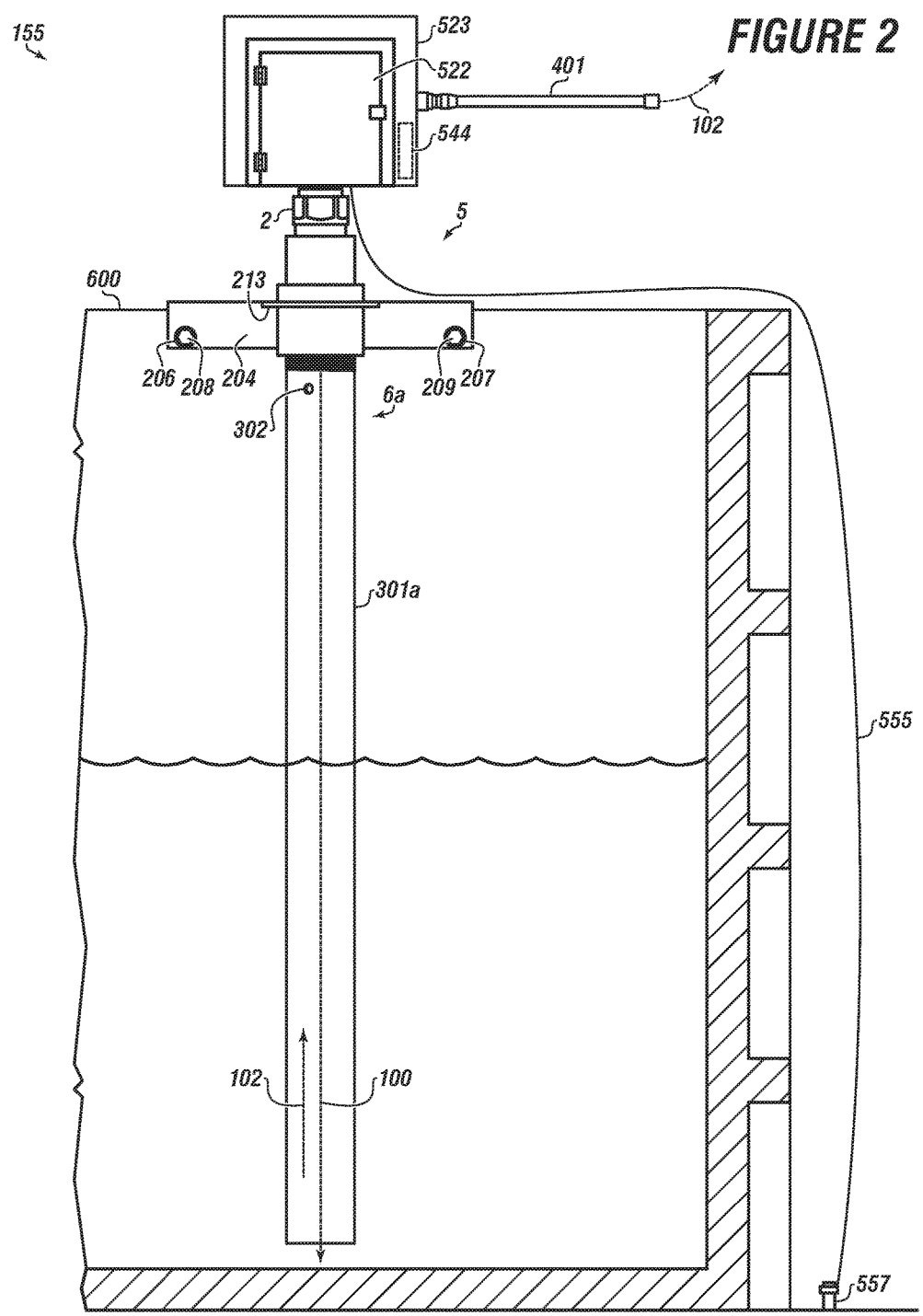
FIG. 2 depicts a sensor assembly according to one or more embodiments.

FIG. 2 depicts a sensor assembly according to one or more embodiments.

The sensor assembly 155 can have at least one turbulence breaker 6a. The at least one turbulence breaker 6a can threadably engage a top tank mounting system 5.

In embodiments, the at least one turbulence breaker 6a can be mounted to the top tank mounting system 5 opposite a single flex probe 2.

The at least one turbulence breaker 6a can controllably direct a radar wave 100 at the bottom of the tank 600 while simultaneously enhancing reflection information by removing noise from reflection information enhancing reflection information accuracy by at least 10 percent by keeping the reflection information within a first hydrostatic fed tubular 301a of the at least one turbulence breaker.

The at least one turbulence breaker 6a can have at least one equalizing hole 302 formed in the first hydrostatic fed tubular 301a. The equalizing hole 302 can release gas as fluid flows into the first hydrostatic fed tubular 301a.

The equalizing hole 302 can be proximate a support plate 213 of the top tank mounting system 5.

The top tank mounting system 5 can have a side mount support bracket, which can be made up of two legs, a first leg, not shown in this Figure, and a second side leg 204.

A first pair of aligned holes 206 can be formed through the first leg and the second leg. A second pair of aligned holes 207 can be formed through the first leg and the second leg and spaced apart from the first pair of aligned holes.

A plurality of fasteners can be used, one in each of the aligned holes. In this embodiment, support bolts 208 and support nuts 209 are shown. Each fastener can be mounted through one hole of the pair of aligned holes.

The sensor assembly can have a housing with a hatch 522, which can have a locking mechanism 523 for locking the housing with the hatch and housing a satellite tracker 544.

In embodiments, the housing with the hatch 522 can be used to allow access to a battery area and a programming area of a guided wave radar level and interface transmitter, shown in in later Figures, and part of the sensor assembly 155.

In embodiments, the housing with the hatch 522 can have an antenna 401, which can be mounted to it, containing the guided wave radar level and interface transmitter. The antenna 401 can facilitate communication with the second wireless controller.

A grounding wire 555 can be connected to the guided wave radar level and interface transmitter and a grounding rod 557, which can be driven into ground adjacent the tank 600.

Figure 3:
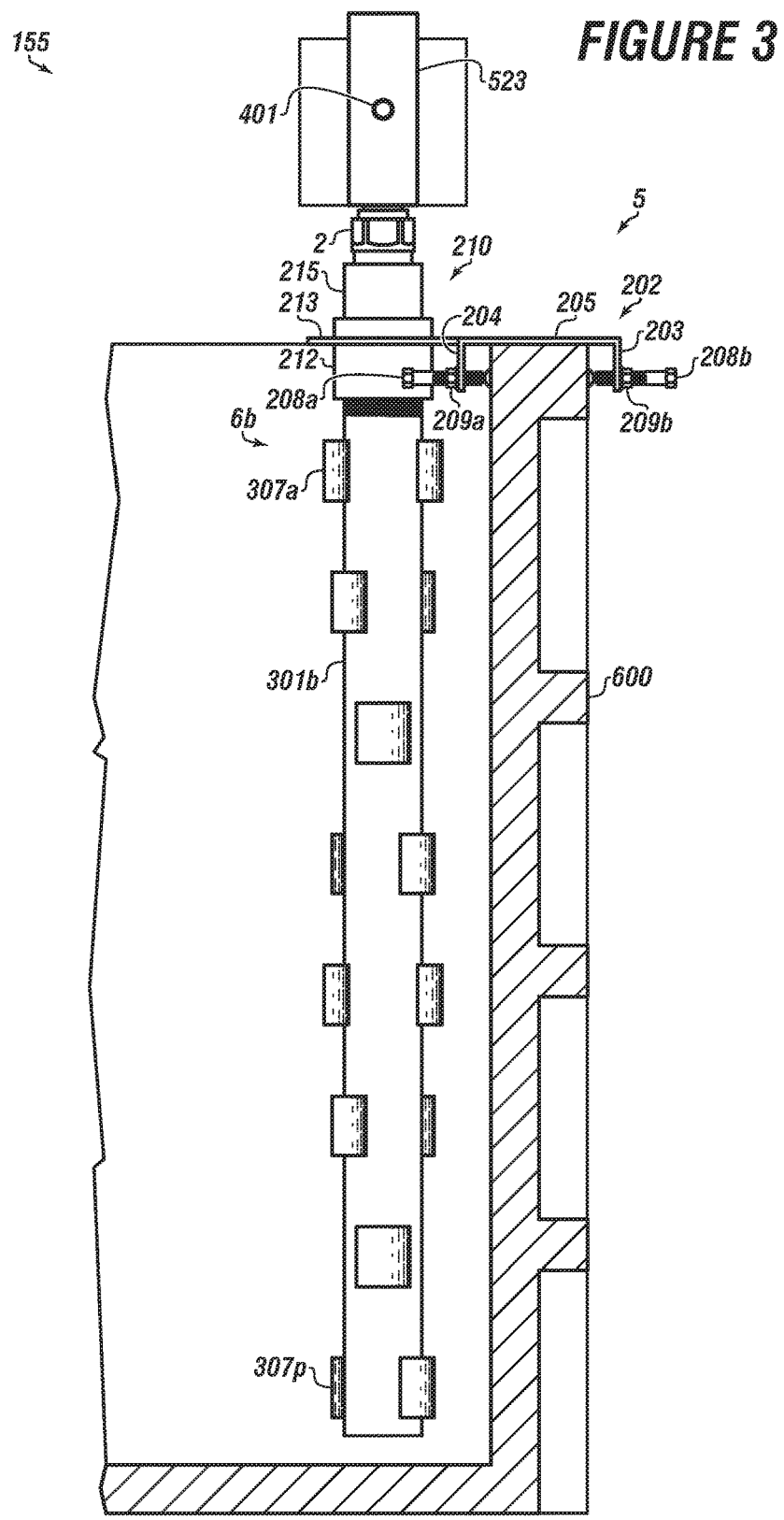
FIG. 3 depicts a sensor assembly with an additional turbulence breaker mounted in a tank according to one or more embodiments.

FIG. 3 depicts a sensor assembly with an additional turbulence breaker mounted in a tank according to one or more embodiments.

The sensor assembly 155 can have an additional turbulence breaker 6b can be mounted in the tank 600, which can be mounted at a different angle than the at least one turbulence breaker.

The sensor assembly 155 can have a pipe chamber support system 210, which can be mounted flush with the side mount support bracket.

The pipe chamber support system can have a pipe collar 212, which can be a 3×3×2 combination pipe collar, which can be mounted on an opposite side of the support plate 213.

The support plate 213 can be mounted around the pipe collar 212. The plane of the support plate can be in parallel with a plane of a top plate 205 of a side mount support bracket 202.

A probe collar 215, which can be a 3×2 inverted probe collar, can be threaded into the pipe collar 212.

The probe collar 215 of the top tank mounting system 5 can allow the sensor wire of the single flex probe 2 to extend from the probe collar 215 through a perforated sleeve within a second hydrostatic fed tubular 301b to rest on the bottom of a tank 600.

The first side leg 203 and the second side leg 204 can be mounted to opposite sides of the top plate 205 and extend down parallel to each other and in the same direction from the top plate 205.

A plurality of fasteners can be used through the legs. One fastener can be mounted in each aligned hole formed inlet. Support bolts 208a and 208b and support nuts 209a and 209b are shown. Each fastener can be mounted through one hole of the pair of aligned holes and secured with a support nut.

Figure 6:
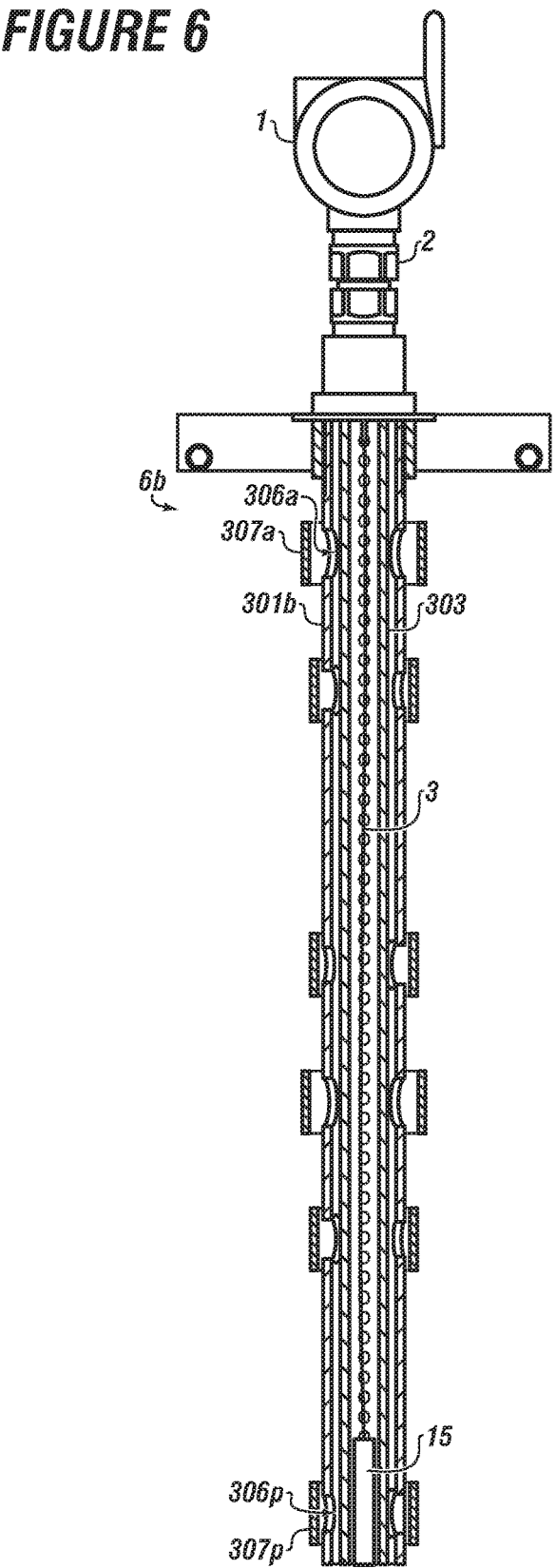
FIG. 6 depicts a cross section of a guided wave radar level and interface transmitter connected to a single flex probe according to one or more embodiments.

The additional turbulence breaker 6b with the second hydrostatic fed tubular 301b can have a plurality of hydrostatic inlet ports, which is shown in FIG. 6, which can be formed in the second hydrostatic fed tubular configured to release a gas as fluid rises in the hydrostatic fed tubular.

A plurality of port protectors 307a-307p are shown. Each port protector can cover each of the plurality of hydrostatic inlet ports.

In embodiments, each port protector of the plurality of port protectors can have a cup shape and an opening facing the bottom of the tank.

The locking mechanism 523 and the antenna 401 are shown mounted to housing with the hatch.

Figure 4:
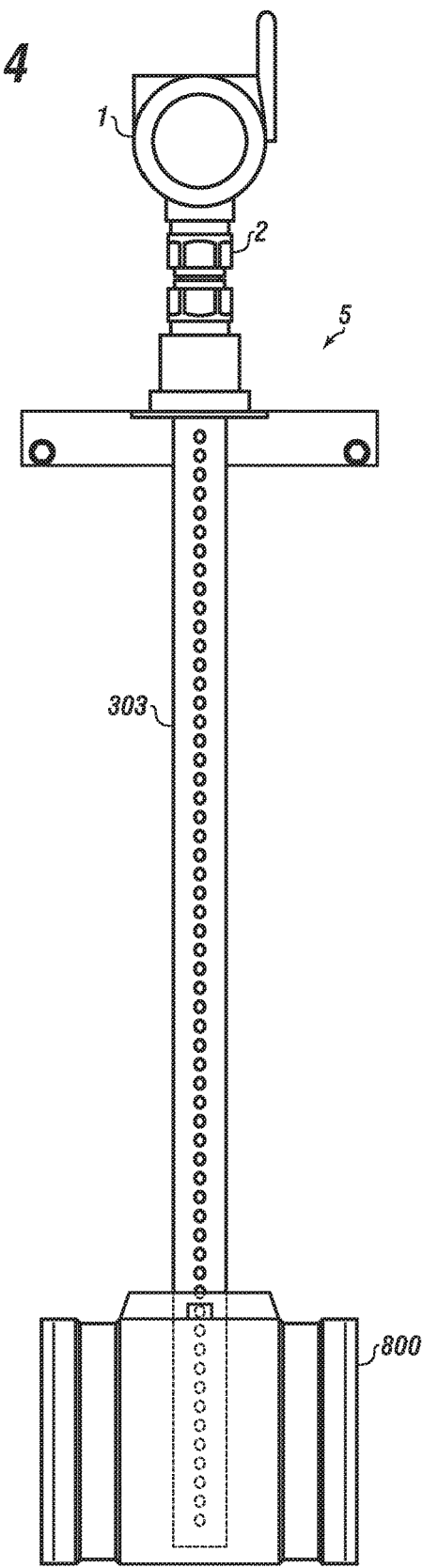
FIG. 4 depicts a guided wave radar level and interface transmitter with a single flex probe connected to a perforated sleeve according to one or more embodiments.

FIG. 4 depicts a guided wave radar level and interface transmitter with a single flex probe connected to a perforated sleeve according to one or more embodiments.

A guided wave radar level and interface transmitter 1 with the single flex probe 2 is shown connected to a perforated sleeve 303 and mounted in a simulated tank 800 for calibrating the guided wave radar level and interface transmitter 1.

The guided wave radar level and interface transmitter 1, which can be a ROSEMONT™ 3308 transmitter can be configured for producing the radar wave, receiving reflection information, and transmitting the reflection information to the network.

In embodiments, it should be noted that the at least one turbulence breaker can have the perforated sleeve 303 within the first hydrostatic fed tubular and can be configured to receive the single flex probe 2.

The top tank mounting system 5 for supporting the single flex probe 2 is also shown.

Figure 5:
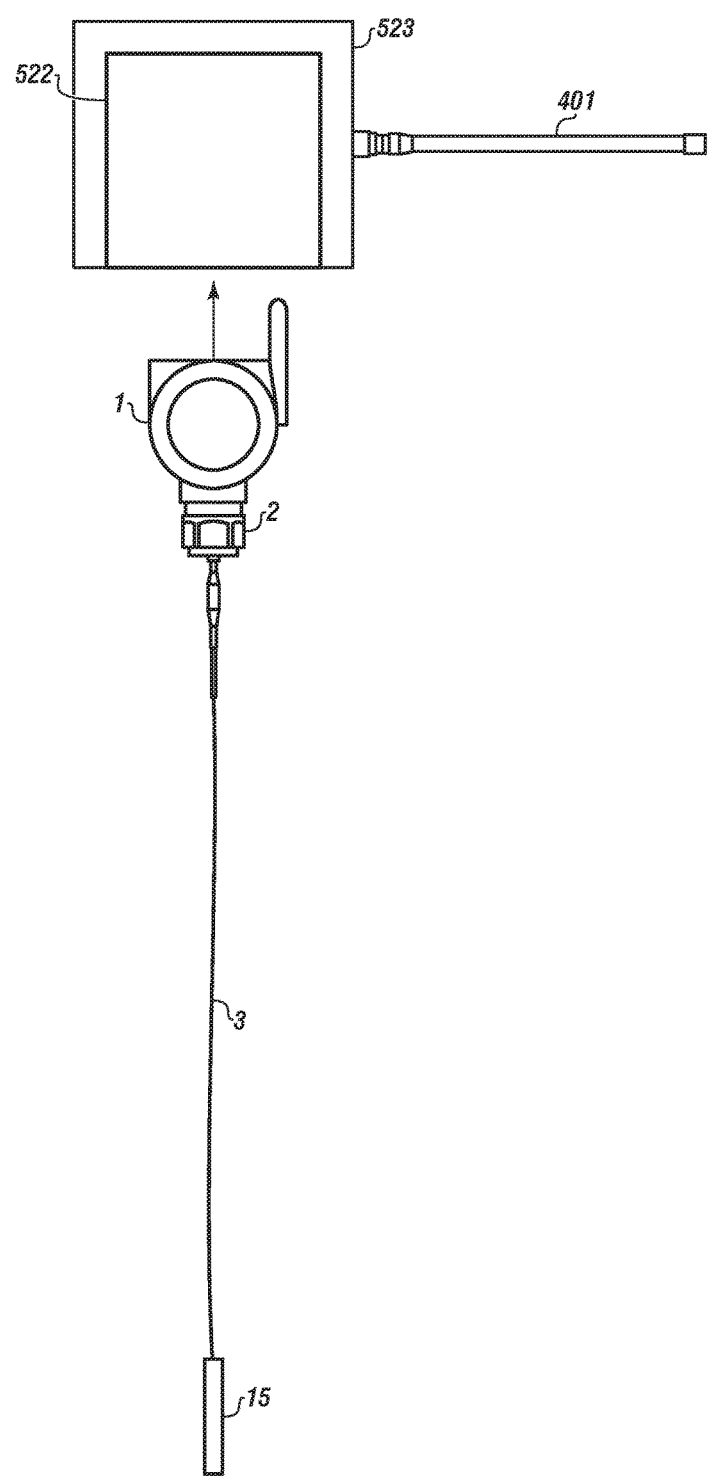
FIG. 5 is a view of a guided wave radar level and interface transmitter with a single flex probe as it fits in a housing with a hatch according to one or more embodiments.

FIG. 5 is a view of a guided wave radar level and interface transmitter with a single flex probe as it fits in a housing with a hatch according to one or more embodiments.

The guided wave radar level and interface transmitter 1 with the single flex probe 2 as it fits in the housing with the hatch 522 having the antennae 401 is shown.

The single flex probe 2 can have sensor wire 3 for guiding the radar wave from the guided wave radar level and interface transmitter 1 into the tank and receiving reflection information. The sensor wire 3 can extend from the single flex probe 2 to a bottom of the tank.

The single flex probe 2 can have a probe weight 15 connected to the sensor wire 3. The probe weight can be configured to center the single flex probe in at least one of the turbulence breakers.

The locking mechanism 523 for locking the housing with the hatch 522 is also shown.

FIG. 6 depicts a cross section of a guided wave radar level and interface transmitter connected to a single flex probe according to one or more embodiments.

In embodiments, the guided wave radar level and interface transmitter 1 with the single flex probe 2 with the sensor wire 3 and the probe weight 15 can be connected to the perforated sleeve 303 in at least one of the turbulence breakers.

The additional turbulence breaker 6b can have a second hydrostatic fed tubular 301b with a plurality of hydrostatic inlet ports 306a-306p formed in the second hydrostatic fed tubular, which can be configured to release a gas as fluid rises in the second hydrostatic fed tubular.

The additional turbulence breaker 6b is shown having the plurality of port protectors 307a-307p, wherein each port protector can cover each hydrostatic inlet port of the plurality of hydrostatic inlet ports 306a-306p.

FIG. 7 is a diagram of the primary and secondary wireless controllers usable in the removable portable wireless fluid sensor system according to one or more embodiments.

The removable portable wireless fluid sensor system can include the primary wireless controller 7, which can have a primary water proof case 701, a primary processor 702 and a primary data storage 703.

The primary wireless processor can be in communication with the secondary wireless controller 8. The secondary wireless controller can be in electronic communication with a network.

The secondary wireless controller can also be in communication with the single flex probe, the guided wave radar level and interface transmitter, and in electrical connection with the primary wireless controller.

The secondary wireless controller can be in a secondary waterproof case 501 with a secondary processor 502, a secondary data storage 504, a wireless controller antenna 505, and a wireless gateway 504.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The secondary wireless controller can connect to a power supply 9.

In embodiments, the secondary wireless controller can be configured to provide a primary measurement, which can be in inches, of fluid in the tank using reflection information, provide a secondary measurement of total volume of fluid in the tank using reflection information, and provide a timer to measure barrels per minute of fluid returning during completion operations of a well using reflection information.

It should be noted that the removable portable wireless fluid sensor system can be configured for coiled tubing operations in completions of hydrocarbon wells, snubbing operations in completions of hydrocarbons wells, water transfer operations during fracturing of a hydrocarbon well, and flow back fluid measurement and well testing procedures for hydrocarbon wells.

In embodiment, the removable portable wireless fluid sensor system can be configured to produce a dielectric constant to generate a radar wave that penetrates an upper product thickness and a lower product thickness to identify at least one a level of a product and a total volume.

In embodiments, the secondary controller processor and secondary data storage can be used to provide a network with an IP address that can enable wireless transmission between the guided wave radar level and interface transmitter and the secondary processor.

In embodiments, the secondary processor and secondary data storage can use a computer based operating system, such as WINDOWS 7®, a radar wave interface fluid sensor configuration software, such as EMERSON™ AMS 3308 configuration software, and a radar wave interface fluid sensor process management gateway software, such as those made by Emerson.

To Install the System in a Tank:

In order to use the system, the following step can be made. For example, calibrate the guided wave radar level and interface transmitter with existing tank variables using a simulated calibration tester.

Install the calibrated guided wave radar level and interface transmitter into the housing with the hatch that allows access to a battery area of the transmitter and enables programming of the guided wave radar level and interface transmitter.

Use the locking mechanism to lock the housing with the hatch to the transmitter. The locking mechanism can additionally houses and covers the satellite tracker.

Thread at least one turbulence breaker to the top tank mounting system.

Thread the single flex probe to the probe collar of the top tank mounting system allowing the sensor wire of the single flex probe to extend from the probe collar through the perforated sleeve within at least one of the hydrostatic fed tubulars to rest on the bottom of the tank.

Install the top tank mounting system on a sidewall of a fluid tank with the single flex probe and the at least one turbulence breaker installed on the top tank mounting system.

Mount the calibrated guided wave radar level and interface transmitter to the single flex probe.

Ground the guided wave radar level and interface transmitter and the housing with the hatch to the grounding rod adjacent the tank with the grounding wire.

Install protectors on or over the fasteners to protect a person from sharp edges.

To Operate the System.

In order to operate the system, the following step can be made. Power up the secondary wireless controller and the primary wireless controller.

Establish communication between the secondary wireless controller and the guided wave radar level and interface transmitter.

Verify that the tank contains fluid and establish an initial fluid level by actuating the guided wave radar level and interface transmitter sending a radar signal and backing up the system with a manual measurement and entering any offset calibration from the calibration step, such as 24 inches, into the secondary wireless controller.

Measure in barrels per minute rates of increase of fluid in the tank using a timer from the data secondary storage of the secondary wireless controller and positions the timer on the display.

View the results on a display or an executive dashboard.

Activate a "join me" team viewer code to present to other operators for screen sharing. The operator can then actuate screen sharing using the "join me code" enabling all operators to see all fluid levels from each processor simultaneously.

Use the primary wireless controller to animate operations, input safe work areas, provide fluid level thresholds, provide and set alarms regarding fluid levels, input weather direction and conditions, and accept texting and email from other operators.

Set operational displays on both wireless controllers to provide all operational variables in animation using real time data that can be data acquired from the sensor within a few seconds of the radar signal being actuated.

While these embodiments have been described with emphasis on the embodiments, it should be understood that within the scope of the appended claims, the embodiments might be practiced other than as specifically described herein.

What is claimed is:

1. A removable portable wireless fluid sensor system of use in hydrocarbon wells comprising:
   a. a sensor assembly comprising:
      (i) a guided wave radar level and interface transmitter configured for producing a radar wave, receiving reflection information, and transmitting the reflection information to a network;
      (ii) a single flex probe with a sensor wire for guiding the radar wave from the guided wave radar level and interface transmitter into a tank and receiving the reflection information, the sensor wire extending from the single flex probe to a bottom of the tank;
      (iii) a top tank mounting system for supporting the single flex probe; and
      (iv) a first turbulence breaker threadably engaging the top tank mounting system opposite the single flex probe, the at least one turbulence breaker controllably directing the radar wave at the bottom of the tank while simultaneously enhancing the reflection information by removing noise from the reflection information enhancing the reflection information accuracy by at least 10 percent;
      (v) a second turbulence breaker comprising:
         (1) a second hydrostatic fed tubular;
         (2) a plurality of hydrostatic inlet ports formed in the second hydrostatic fed tubular configured to release a gas as fluid rises in the second hydrostatic fed tubular;
         (3) a plurality of port protectors, each port protector of the plurality of port protectors covering a hydrostatic inlet port; and
         (4) the perforated sleeve within the second hydrostatic fed tubular for receiving the single flex probe;
   b. a primary wireless controller with a primary water proof case, a primary processor and a primary data storage;
   c. a secondary wireless controller in communication with the network, the single flex probe, the guided wave radar level and interface transmitter, and the primary wireless controller, wherein the secondary wireless controller is configured to:
      (i) provide a primary measurement of inches of fluid in the tank using the reflection information;
      (ii) provide a secondary measurement of total volume of fluid in the tank using the reflection information; and
      (iii) provide a timer to measure barrels per minute of fluid returning during completion operations of a well using the reflection information; and
   d. a power supply connected to the secondary wireless controller;
   wherein the removable portable wireless fluid sensor system configured for coiled tubing operations in completions of hydrocarbon wells, snubbing operations in completions of hydrocarbons wells, water transfer operations during fracturing of a hydrocarbon well, and flow back fluid measurement and well testing procedures for hydrocarbon wells.

2. The removable portable wireless fluid sensor system of claim 1, wherein the single flex probe comprises a probe weight, wherein the sensor wire connected to the probe weight, the probe weight configured to center the single flex probe in the at least one turbulence breaker.

3. The removable portable wireless fluid sensor system of claim 1, the top tank mounting system comprising:
   a. a side mount support bracket comprising:
      (i) a first leg;
      (ii) a second leg; and
      (iii) a top plate mounted between the first leg and the second leg;
   b. a first pair of aligned holes formed through the first leg and the second leg;
   c. a second pair of aligned holes formed through the first leg and the second leg spaced apart from the first pair of aligned holes;
   d. a plurality of fasteners mounted through the first pair of aligned holes, the second pair or both the first pair of aligned holes and the second pair of aligned holes;
   e. a pipe chamber support system mounted flush with the side mount support bracket, the pipe chamber support system comprising:
      (i) a pipe collar; and
      (ii) a support plate mounted around the pipe collar, a plane of the support plate in parallel with a plane of the top plate; and
   f. a probe collar threaded into the pipe collar.

4. The removable portable wireless fluid sensor system of claim 3, wherein the at least one turbulence breaker comprises:
   a. a first hydrostatic fed tubular;
   b. at least one equalizing hole formed in the first hydrostatic fed tubular releasing a gas as fluid flows into the first hydrostatic fed tubular, the equalizing hole proximate the support plate; and
   c. a perforated sleeve within the first hydrostatic fed tubular configured to receive the single flex probe.

5. The removable portable wireless fluid sensor system of claim 1, wherein each port protector of the plurality of port protectors can have a cup shape and an opening facing the bottom of the tank.

6. The removable portable wireless fluid sensor system of claim 1, comprising an antenna mounted to the guided wave radar level and interface transmitter facilitating communication with the secondary wireless controller.

7. The removable portable wireless fluid sensor system of claim 1, comprising a dielectric constant to generate the radar wave that penetrates an upper product thickness and a lower product thickness to identify at least one level of a product and a total volume.

8. The removable portable wireless fluid sensor system of claim 1, wherein the secondary wireless controller comprises:
   a. a secondary waterproof case;
   b. a secondary processor with a secondary data storage;
   c. a wireless gateway mounted in the secondary waterproof case connected to the secondary processor for providing the network with an IP address that enables wireless transmission between the guided wave radar level and interface transmitter and the secondary processor; and
   d. a wireless controller antenna mounted to the secondary waterproof case connected to the wireless gateway.

9. The removable portable wireless fluid sensor system of claim 8, the secondary data storage comprises a computer based operating system, a radar wave interface fluid sensor configuration software, and a radar wave interface fluid sensor process management gateway software.

10. The removable portable wireless fluid sensor system of claim 1, further comprising a grounding wire connected to the guided wave radar level and interface transmitter and a grounding rod driven into ground adjacent the tank.

11. The removable portable wireless fluid sensor system of claim 1, further comprising a simulated tank for calibrating the guided wave radar level and interface transmitter.

12. The removable portable wireless fluid sensor system of claim 1, further comprising a housing with a hatch allowing access to a battery area and a programming area of the guided wave radar level and interface transmitter and a locking mechanism for locking the housing with the hatch and housing a satellite tracker.

* * * * *